Dec. 18, 1934. S. M. STRAUS Re. 19,402

METHOD OF MAKING IMITATION PIGSKIN ARTICLES

Original Filed June 2, 1933

INVENTOR
Sylvan M. Straus
BY Mock & Blum
ATTORNEYS

Reissued Dec. 18, 1934

Re. 19,402

UNITED STATES PATENT OFFICE 19,402

METHOD OF MAKING IMITATION PIGSKIN ARTICLES

Sylvan M. Straus, Gloversville, N. Y.

Original No. 1,922,507, dated August 15, 1933, Serial No. 673,996, June 2, 1933. Application for reissue June 14, 1934, Serial No. 730,654

My invention relates to a new and improved method of making imitation pigskin articles.

One of the objects of my invention is to provide an improved method, which shall minimize the cost of manufacture.

Another object of my invention is to provide a glove, having a uniform pattern, without any distortion which results from the stretching of the skin.

Another object of my invention is to provide a method, in which all the parts of the glove, or some of these parts, are caused to adhere to a sheet of paper, and to then feed the paper, together with the attached pieces of skin, through a machine which has a prick point die, so that the pattern is formed in a uniform and reliable manner, and this pattern is not distorted by any of the subsequent operations.

Other objects of my invention will be set forth in the following description and drawing, which illustrates a preferred embodiment thereof, it being understood that the above statement of the objects of my invention is intended to generally explain the same, without limiting it in any manner.

Heretofore, in making imitation pigskin gloves, the gloves have been made from any suitable type of skin, such as sheepskin, goatskin, and deerskin. The skin was pricked, punched, and embossed, so as to imitate the natural hair-holes of a genuine skin.

After the skins had thus been formed with the pattern, the skin was dyed, it was cut down by means of an abrasive wheel, to the proper weight, and in this cutting down or wearing down of the skin, a tremendous and variable and uncontrollable sketch occurred, which completely distorted the pattern.

The skin was then manipulated by the glove-cutter, and it was again moistened and stretched in both directions, which additionally distorted the pattern.

Up to this time, the glove was known in the trade as a glove trank, this being a piece or section of leather, having dimensions of approximately nine inches by ten inches. This trank was then ready for the press-die which cut out the pieces conforming to the shape of the body of a glove, the fingers, the thumb-holes, etc.

According to my invention, all of the glove pieces, which consist of the tranks 1 and 1*a*, the thumb-pieces 2 and 2*a*, and the fourchettes F, are placed upon a long paper roll P. This roll of paper P may be of any desired length, and any desired number of such units can be pasted or otherwise caused to adhere or to be connected to, said paper roll. The pieces of leather can be connected to the paper by means of any suitable adhesive or cement, so that said pieces of leather can be readily removed from the paper, whenever desired.

Prior to connecting the pieces of leather to the paper, the leather or skin has been completely manipulated and cut so as to form the glove trank. That is, the operations of dyeing, cutting down on the abrasive wheel, and all the operations which have been previously mentioned, have been completed before the pieces of leather are caused to adhere to the paper P.

Figure 1:
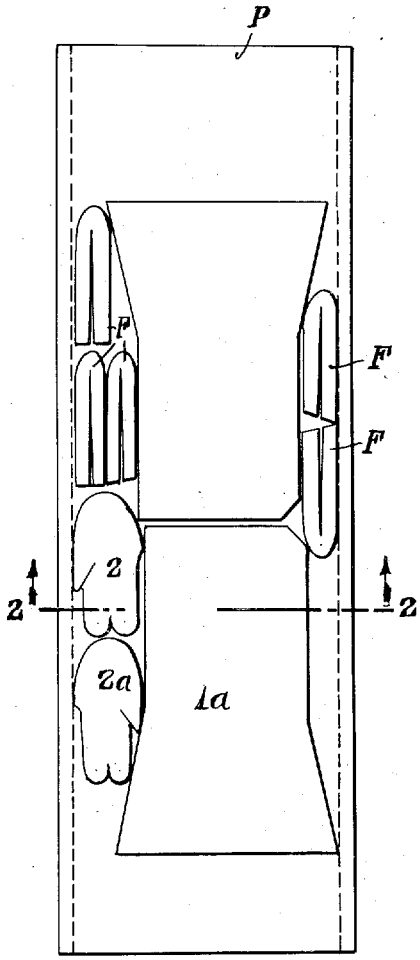
Fig. 1 is a plan view showing the various parts of the glove located upon the surface of a sheet of paper.
Figure 2:
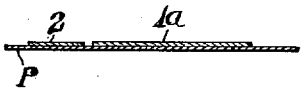
Fig. 2 is a sectional view on the line 2—2 of Fig. 1.

It will be noted that the units for each glove are assembled in the manner which is shown in Fig. 1.

The paper, with the adhering strips of leather, is then fed through the perforating machine, and over the pricking die, which may be of the ordinary and well known type.

The pattern which is thus formed, is regular and uniform, because the stretching of the leather is prevented by the adherence of each leather strip to the paper, which is substantially not stretchable. Any suitable, flexible, and heavy paper can be utilized.

By the old method previously mentioned, there was a waste of at least one-half a foot to three-quarters of a foot of leather, on almost every skin, and this waste was very expensive.

Likewise the die frequently produced work which overlapped, thus producing a waste of another quarter of a foot.

By means of the improved method, the waste is substantially eliminated, and a very substantial economy is secured.

Likewise, according to the improved method herein disclosed, the leather in the trank condition has been thinned, stretched, and manipulated for cutting, and no more of these operations are necessary after the pricking has been completed, so that the pattern which is formed by the pricking of the finished glove, remains clear and uniform throughout the glove.

According to the improved method, I prefer to use a prick die for forming the pattern, instead of using a perforating die. This prick die has points which form depressions in the skin, and these depressions constitute the pattern.

The prick die which is used is large enough so as to form the pattern upon all the pieces of leather which are shown in Fig. 1, said pieces of leather constituting the parts for a complete glove.

Figure 3:
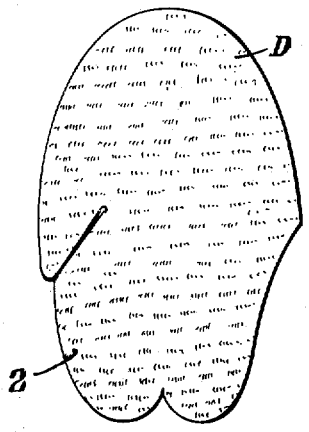
Fig. 3 is a plan view showing a part of a glove, with the pattern.

Referring to Fig. 3, the pattern is referred to by the points D, and any suitable pattern could be utilized.

Referring to the operations prior to the pricking of the pattern, these operations may be designated as the "finishing operations" for the leather.

That is, the finishing operations refer to those operations which would stretch the leather, or distort or affect the pattern in any manner, if such operation were performed subsequent to the formation of the pattern.

Instead of using a machine, the flat prick-die could be pressed upon each set of the assembled parts which are shown in Fig. 1, so as to simultaneously form the depressions D upon each of said parts. The use of a single prick die for simultaneously forming the pattern upon all the pieces of leather produces a regular and uniform pattern.

While I have referred to the mounting of the pieces of leather upon a sheet of paper, the base or mounting material may be cloth or any other suitable material. Likewise, the base material (paper or the like) need not be absolutely unstretchable.

I have shown a preferred embodiment of my invention, but it is clear that numerous changes and omissions could be made without departing from its spirit.

I claim:

1. A method of making an imitation pigskin article, which consists in finishing the leather, cutting the leather into parts corresponding to the article, connecting these parts to a sheet of paper, and subjecting the pieces of leather to a pricking operation, while they are so connected to the piece of paper.

2. A method of making an imitation pigskin article, which consists in connecting finished pieces of leather to a sheet of paper so as to substantially prevent any stretch of said pieces of leather, and then pricking a pattern in said pieces of leather.

3. A method of making an imitation pigskin article, which consists in applying to a sheet of paper the pieces of leather which correspond to the article, said pieces of leather being in the finished form, and then simultaneously pricking a pattern in all said pieces of leather.

SYLVAN M. STRAUS.